United States Patent [19]
Niemkiewicz et al.

[11] 3,795,419
[45] Mar. 5, 1974

[54] BI-AXIAL SHOCK ABSORBING BUMPER
[75] Inventors: Ignatius John Niemkiewicz, Wilmington, Del.; William S. Aseltine, Devon, Pa.
[73] Assignee: Gulf & Western Industrial Products Company, Grand Rapids, Mich.
[22] Filed: June 9, 1972
[21] Appl. No.: 261,507

[52] U.S. Cl. .................................. 293/88, 267/140
[51] Int. Cl. ........................................... B60r 19/08
[58] Field of Search ...... 293/70, 71 R, 71 P, 85, 86, 293/88, 89; 114/219; 267/63 R, 139, 140, 141, 153

[56] References Cited
UNITED STATES PATENTS

| | | | |
|---|---|---|---|
| 3,245,646 | 4/1966 | Baratoff | 267/141 |
| 3,656,792 | 4/1972 | Tavano, Sr. | 293/88 |
| 3,121,560 | 2/1964 | Reed | 267/63 R |
| 3,666,310 | 5/1972 | Burgess et al. | 293/71 R |
| 2,628,118 | 2/1953 | Gunnels, Jr. | 293/86 |

FOREIGN PATENTS OR APPLICATIONS
1,066,193   4/1967   Great Britain

*Primary Examiner*—Gerald M. Forlenza
*Assistant Examiner*—Robert Saifer
*Attorney, Agent, or Firm*—Meyer, Tilberry & Body

[57] ABSTRACT

A shock absorbing bumper for a vehicle (or structure) is capable of absorbing impact forces along both a frontal and a lateral axis. The bumper comprises at least one pair of complementary, telescopically engaging chambers at least partially encompassed by a fixed housing, with one of the chambers mounted on a slide bar and the other having an impact-receiving face affixed thereto. The slide bar and consequently the chambers are laterally moveable with respect to the fixed housing. Shock absorbing material, e.g., a resilient plastic foam material, is contained within the chambers and the fixed housing.

Frontal impact forces will drive the pair of telescopic chambers together, compressing the shock absorbing material between them. Lateral impact forces will drive the slide bar and chambers laterally with respect to the fixed housing, compressing the shock-absorbing material between the housing and the chambers.

14 Claims, 9 Drawing Figures

BI-AXIAL SHOCK ABSORBING BUMPER

This invention pertains to the art of shock absorbing bumpers in general, and more particularly to shock absorbing bumpers for vehicles. The invention is particularly applicable to shock absorbing bumpers for automobiles and trucks and will largely be described with reference thereto, although it will be appreciated that the invention has broader application, such as serving as a shock absorbing bumper for buildings, docks, machines, etc. and as a protective shock absorbing device for structures in general.

For many years automobile bumpers consisted merely of rigid metal bars or beams affixed to the chassis of the automobile by a metal strap or connector. The main function of such bumpers was to prevent structural damage to the sheet metal fenders and to the grille of the vehicle, and served to reduce only very little, if at all, the impact forces transmitted to the chassis of the vehicle and to its occupants.

In recent years there has been an increasing awareness of the need to improve the shock absorbing capacities of vehicle (and other) bumpers. This is particularly true in the case of automobiles where even very low speed collisions usually result in extensive damage to the vehicle body, and often in injury to its occupants. In attempting to develop shock absorbing automobile bumpers which would absorb more than a negligible portion of the impact of a collision, it is known in the art to provide an automobile or other bumper which contains a pad of resilient or shock absorbing material which is compressed upon impact and absorbs a significant portion of the total forces of impact, particularly in low speed collisions, and returns to its original shape after the forces are spent.

Accordingly, bumpers containing shock absorbing material such as foam plastics, e.g., polyurethane foam plastics, affixed to a backing plate and containing an outer covering or face-plate are known in the art.

It is also known, as shown in co-pending U.S. Pat. application Ser. No. 105,589, filed Jan. 11, 1971, now patent no. 3666310 and assigned to the assignee of this application, to provide an impact-distributing plate in such bumpers so as to avoid localized over compression and tearing of the shock absorbing material, and to help distribute the impact forces over substantially the entire length of the bumper.

It is also known, as further disclosed in U.S. Pat. application Ser. No. 105,589, to mount such impact-receiving plate movably in relation to the back plate, which is rigidly affixed to the vehicle or structure to be protected. As shown in detail in the aforesaid patent application, this may readily be accomplished by affixing the impact-distributing plate to one or more pins which slideably engage sleeves contained in the rigidly affixed back plate. In this manner, impact forces imposed on the impact-receiving plate are not directly transmitted through the pins to the back plate, but are transmitted exclusively through the shock absorbing material contained between the impact-receiving plate and the backing plate. The pins contained within the backing plate sleeves serve to hold the assembly together and to transmit to the rigid backing plate vertical forces, such as those which would be imposed on a bumper by a bumper jack being employed to raise the vehicle.

The foregoing type of structure has many advantages and is well adapted to receive and dissipate frontal impact forces, i.e., forces which are imposed substantially parallel to the longitudinal axis of the pin and sleeve combination. However, such an arrangement has the disadvantage that when lateral forces are imposed upon it, i.e., forces which are imposed at an angle to the axis of the sleeve and pin combination, the pin and sleeve combination may bind, and directly transmit such forces from the impact-receiving plate to the rigidly affixed back plate, substantially by-passing the force-dissipating effect of the shock absorbing material contained therebetween. If the lateral forces are sufficiently large, the pin and sleeve combination may bend or break.

In general, shock absorbing schemes for a bumper, whether employing a compressible shock-absorbing material, or springs, or hydraulic devices, are limited in that normally they can effectively absorb and dissipate impact forces only in a uniaxial direction. Impact forces imposed in a direction which is not substantially parallel to the axis of effective shock absorption, if they do not unseat or damage the shock absorption device itself, are generally transmitted substantially undissipated to the structure to be protected.

The present invention accordingly contemplates a shock absorbing bumper with biaxial shock absorbing and dissipating capacity. That is to say, the bumper of the invention can simultaneously absorb and dissipate frontal and lateral impact forces in a bumper of relatively simple design.

In accordance with the present invention, there is provided a biaxial shock absorbing bumper comprising at least two telescopically engaging chambers containing a shock-absorbing material between them. The chambers are at least partly contained within a housing and are movable laterally with respect to the (relatively) fixed housing. One or more blocks of a shock-absorbing material are contained between the chambers and the walls of the housing, along the path of lateral movement between the chambers and the housing. Preferably, two blocks are employed, one each adjacent opposite sides of the chambers. An impact-receiving face bar is affixed to one of the chambers.

Upon the imposition of frontal impact forces, the telescopic chambers are driven in closing movement which increases in a closing direction their overlap relative one to another, and the shock-absorbing material contained within the chambers is compressed therebetween, thereby absorbing a portion at least of the impact forces.

Upon the imposition of lateral impact forces, the chambers are driven laterally towards one of the walls of the fixed housing and the shock-absorbing material contained between the chambers and the housing is compressed therebetween, thereby absorbing a portion at least of the impact forces. In the usual case, the impact forces will impose both frontal and lateral vectors which are simultaneously absorbed as above.

The chambers may be, and preferably are, provided with longitudinal support means which maintain the chambers in alignment along their longitudinal axis and defines the longitudinal path along which the chambers travel in closing movement (which increases their overlap relative to one another) and in opening movement (which decreases their overlap.) The longitudinal support means may have a stop or flange associated therewith to limit the opening movement travel of the chambers.

The following terms used in this specification and claims shall have the meanings given below Reference to chambers which are "telescopically engaging" or in "telescopic engagement," or the like, shall mean that the chambers are, like the chambers of a telescope, of graduated sizes and arranged in overlapping engagement at their respective ends along a common longitudinal axis. (Because of their graduated size, the chambers are free to slide along their common longitudinal axis one into the other. Because of the permanent overlapping-end engagement, any movement which shifts or pivots the longitudinal axis of the chambers moves all the chambers as a unit.)

"Closing movement" of the telescopically engaged chambers means movement along their common longitudinal axis which increases the amount of overlap of the chambers one with another and which thereby tends to compress material contained within the chambers.

Conversely, "opening movement" of the chambers means movement along their common longitudinal axis which decreases the amount of overlap between respective chambers, thereby reducing the compressive force on material contained within the chambers.

"Lateral movement" or "laterally" used to describe movement of the chambers (and the slide bar on which the chambers are mounted) shall mean movement transversely of the longitudinal axis of the chambers, i.e., a sidewise movement or shifting of the longitudinal axis of the telescopically engaged chambers.

The "fixed housing" means structure which encompasses a portion or all the length (along the longitudinal axis) of the telescopically engaged chambers, and is fixed relative to lateral movement of the telescopic chambers. The fixed housing may typically comprise simply one or more stops or guides at a given distance from the telescopically engaged chambers, or it may comprise a housing circumscribing one end at least of the telescopic chambers.

In all cases, the "outer" or "forward" end or one of a component is the end or one facing the direction from which impact on the bumper is received.

While any suitable shock absorbing material may be employed, a preferred material in accordance with one aspect of the invention is a compressible, foamed plastic material. Foam plastic materials are preferred because of their freedom from problems of leakage and liquid seals, their toughness and durability, and their ability to return to their original shape after the impact forces are relieved. Among the most commonly employed plastic foam materials are urea-based foams such as urea-formaldehyde foam plastics, polyurethane foam plastics, and epoxy foam plastics.

Of the many foam plastic materials available, polyurethane foam materials are the most preferred because of their generally satisfactory properties and wide commercial availability. Of the many available foam materials, "tight open cell" foams (defined below) are most preferred because of their very high impact absorbing capacities. Tight open cell foam materials, whether of polyurethane or of any other suitable plastic material, are also preferred.

As is well-known, in the manufacture of foam plastic materials, air or another gas is employed to form a multitude of tiny cells or air (gas) pockets within the material. These tiny air or gas pockets are referred to as cells. The cells may have surfaces which are substantially impervious to passage of the air or gas contained with in therethrough, in which case the cells are referred to as "closed cells." In a closed cell foam the air (gas) contained within the cells is compressed by deformation of the foam material and expands when the deforming pressure is removed. The work done by compression of the gas or air within the cell absorbs a portion of the imposed energy.

On the other hand, the wall of the gas or air cells may contain tiny openings therethrough in which case the cell is referred to as a "open" cell. Since these openings are small relative to the cell size, the foam material is referred to as a "tight" foam material. Hence, a "tight open cell" foam, as that term is used in the specifications and claims, means a foam plastic material containing cells which have small "window" openings in the cell wall through which the gas contained in the cell may be forced. These openings permit the escape of gas or air from the cell into interstices in the foam material upon deformation of the cells. The work required to expel the gas or air through the cell wall openings and through the interstices of the foam material helps to absorb impact energy input. Upon recovery of its original shape, air is drawn back through the openings into the cells.

Naturally, the elasticity of the foamed plastic material itself contributes substantially to the total shock-absorbing capacity of the material, by absorbing the energy required to deform the material.

It has been found that high energy absorption by a foam plastic material is attained by employing a high density foam plastic, preferably a polyurethane foam, which has both open and closed cells, and which open cells contain openings which are small relative to the cell size, i.e., a high density, tight, open cell foam. Accordingly, a tight, open cell foam plastic is a preferred shock absorbing material for use in accordance with the invention, and a tight open cell foam plastic of higher density polyurethane is particularly preferred.

A high density foam material, i.e., one of greater than about 7 pounds per cubic foot, preferably between about 10 to 20 pounds per cubic foot density, with between about 90 to about 99 percent of the total number of cells being of the small "window" cell wall opening type, and the remainder, between about 10 to about 1 percent, being of the closed cell type, is preferred. A polyurethane plastic foam in accordance with the foregoing is particularly preferred.

In most cases the impacts to which a vehicle is subjected are imposed at a variety of angles through a horizontal plane passing through the longitudinal axis of the bumper. For example, an automobile bumper is subject to impact from other vehicles and with fixed structures, which impact forces may be imposed on the bumper in a plane passing through the longitudinal axis of the bumper at any angle ranging from a head-on collision (in which case the entire force of collision is imposed along an axis perpendicular to the longitudinal axis of the bumper), to a side collision striking the bumper (in which case the entire force is imposed along an axis parallel to the longitudinal axis of the bumper). When collisions are had at an angle intermediate the two extremes, corresponding parallel and perpendicular force vectors are imposed. Accordingly, the bumper of the present invention affords impact-absorption capability along axes both perpendicular to and parallel to the longitudinal axis of the bumper. This is accomplished in accordance with the invention by providing for compression of shock absorbing material simultaneously along two axes which are perpendicular, one with respect to the other.

It is an object of the present invention to provide a shock absorbing bumper capable of absorbing impact forces biaxially, i.e., in both a frontal and lateral direction.

It is another object of the invention to provide a shock absorbing bumper which employs a high density, tight cell polyurethane foam as a shock absorbing material to biaxially absorb impact forces.

Other objects and advantages of the invention will become apparent from the following detailed description of the invention, including specific embodiments thereof which are for the purpose of illustrating the invention, but do not define the limits thereof. The invention may take physical form in certain parts and arrangements of parts, specific embodiments of which are shown in the attached drawings which form a part hereof and wherein.

Figure 1:
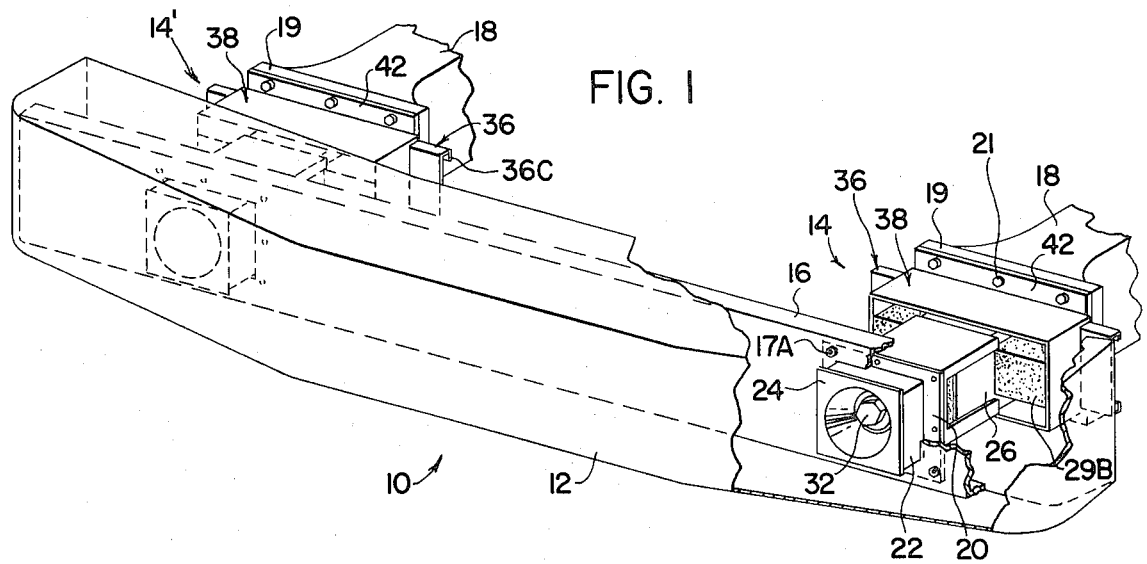
FIG. 1 is a partially broken away, isometric view of a biaxial shock absorber bumper in accordance with the invention.

Referring now to the drawings, and particularly to FIG. 1, a bumper assembly in accordance with the invention is designated generally by the numeral 10 and is seen to comprise a bumper face bar 12 affixed to a reinforcing web 16 and mounted on a pair of biaxial energy absorbers 14. Energy absorbers 14 include backing plates 42, (FIG. 2) and are in turn affixed to vehicle frame 18 by bolts 21 which attach backing plates 42 to mounting brackets 19 (Best shown in FIG. 7).

Figure 2:
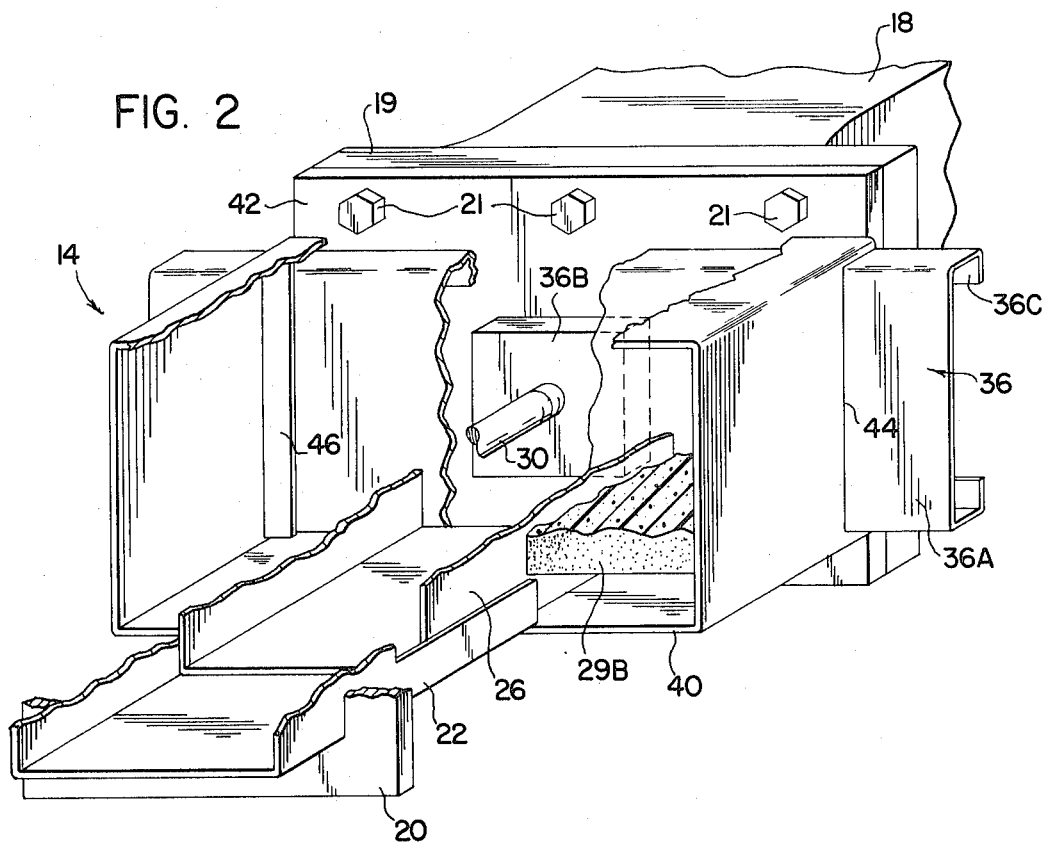
FIG. 2 is a partially broken away, enlarged view of a portion of the bumper of FIG. 1.
Figure 3:
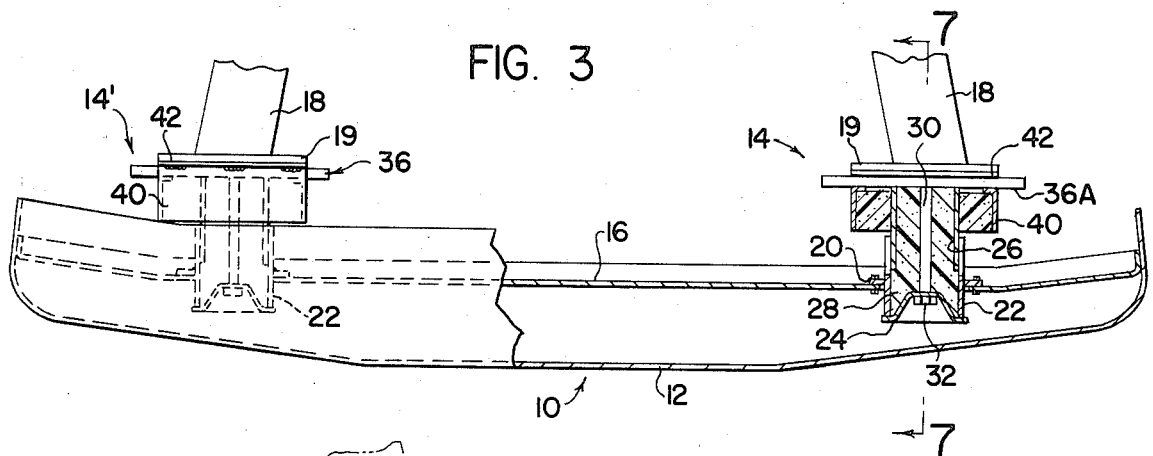
FIG. 3 is a plan view in partial section of the bumper of FIG. 1 in its normal or non-compressed condition.

The component parts of energy absorber 14 will now be described. As best seen in FIGS. 1 and 2, an outer chamber 22, of substantially rectangular cross section telescopically engages an inner chamber 26, also of substantially rectangular cross section. Inner chamber 26 is small enough in cross section to be received within outer chamber 22.

A flange 20 is provided around the periphery of outer tube 22, and a recessed end wall 24 closes the leading end thereof.

Figure 7:
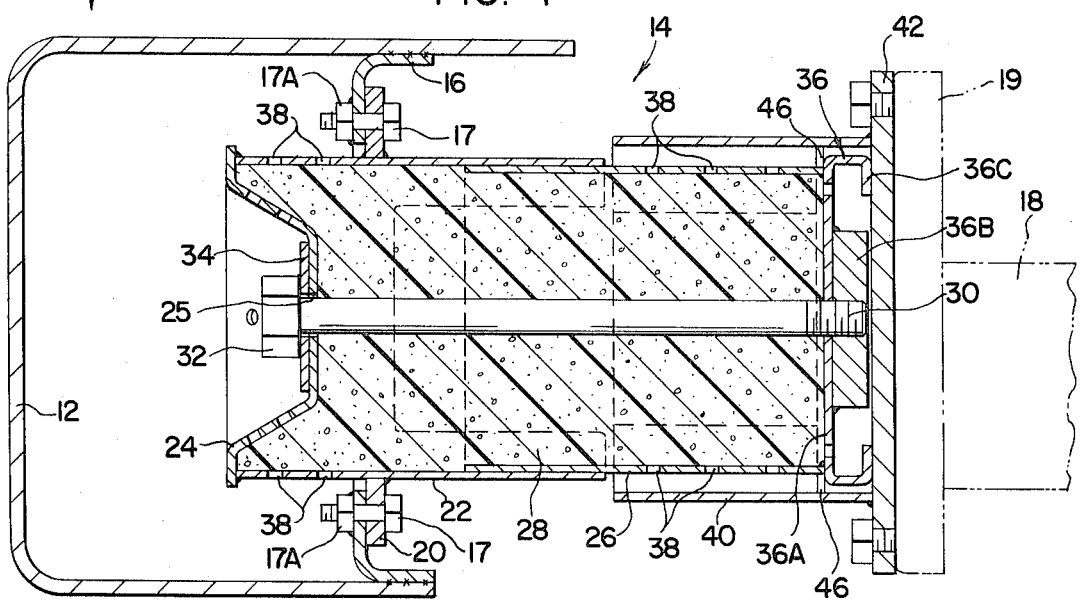
FIG. 7 is an enlarged section view taken along section line 7—7 of FIG. 3.

A slide bar 36, as best shown in FIGS. 2 and 7, comprises a channel member 36A which is welded to a center bar 36B. The trailing end of inner chambers 26 is affixed, as by welding, to slide bar 36.

The interior of chambers 22 and 26 (FIGS. 7 and 9) is substantially filled with a compressible, energy-absorbing foam plastic material 28. (Foam plastic material 28 is not shown in FIG. 2, for clarity).

Longitudinal support means for the chambers is provided by center bolt 30 (FIG. 7) which is fastened to slide bar 36, as by being threaded through channel member 36A and into center bar 36B. Recessed end wall 24 has a central opening 25 therein to receive center bolt 30. Opening 25 is large enough relative to the diameter of bolt 30 to permit outer chamber 22 to travel along bolt 30. A nut 32 is threaded to the leading end of bolt 30 to limit the forward travel of outer chamber 22 and prevent it from disengaging from bolt 30. A washer 34 may be placed between nut 32 and end wall 24 as shown.

A fixed housing 40, has two slots 44 formed therein (FIGS. 2 and 9) by cutting two guide flanges 46 from opposite side walls of housing 40, and turning flanges 46 inwardly. Slots 44 receive slide bar 36 in sliding engagement with fixed housing 40 so that guide flanges 46 bear on the leading surface of slide bar 36. Fixed housing 40 is affixed to backing plate 42, as by welding, so that the turned flanges of slide bar 36 bear on backing plate 42. This arrangement permits lateral sliding movement of slide bar 36 (and chambers 22 and 26 mounted thereon) relative to fixed housing 40, as more fully explained hereinbelow.

Foam plastic material blocks 29A and 29B are positioned between inner chamber 26 and the side walls of fixed housing 40. Blocks 29A, 29B are held in place by any suitable means (not shown) such as, e.g., adhesive or clips, pins or the like affixing blocks 29A, 29B to the walls of fixed housing 40. Blocks 29A, 29B are not affixed to inner chamber 26.

Figure 8:
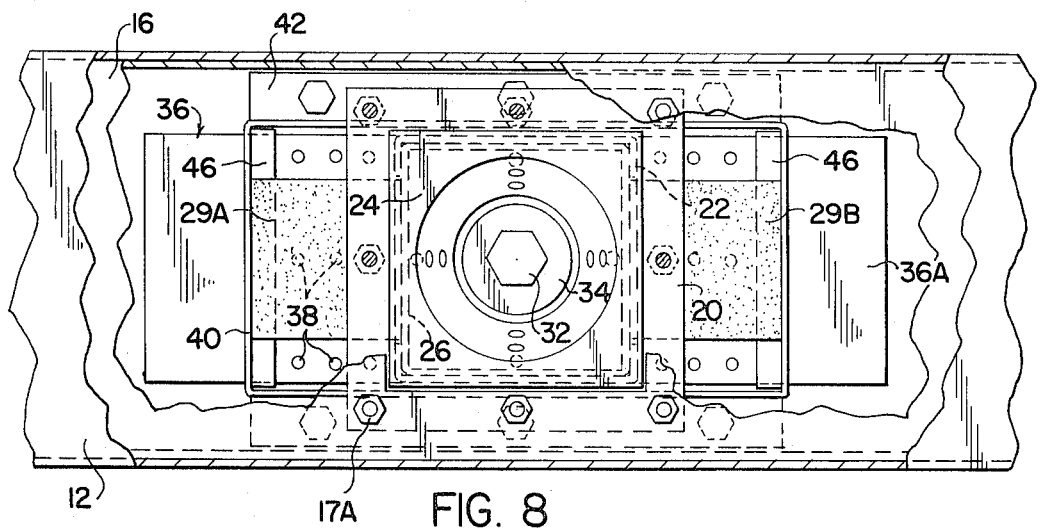
FIG. 8 is a partially broken away, enlarged frontal elevation view of a portion of the bumper of FIG. 1.

Air escape ports 38 (FIGS. 7, 8 and 9) are provided in inner chamber 26, outer chamber 22, end wall 24 and slide bar 36, in the latter case, at or near those areas of slide bar 36 which contact foamed plastic material 28 or foamed plastic material blocks 29A or 29B.

Figure 9:
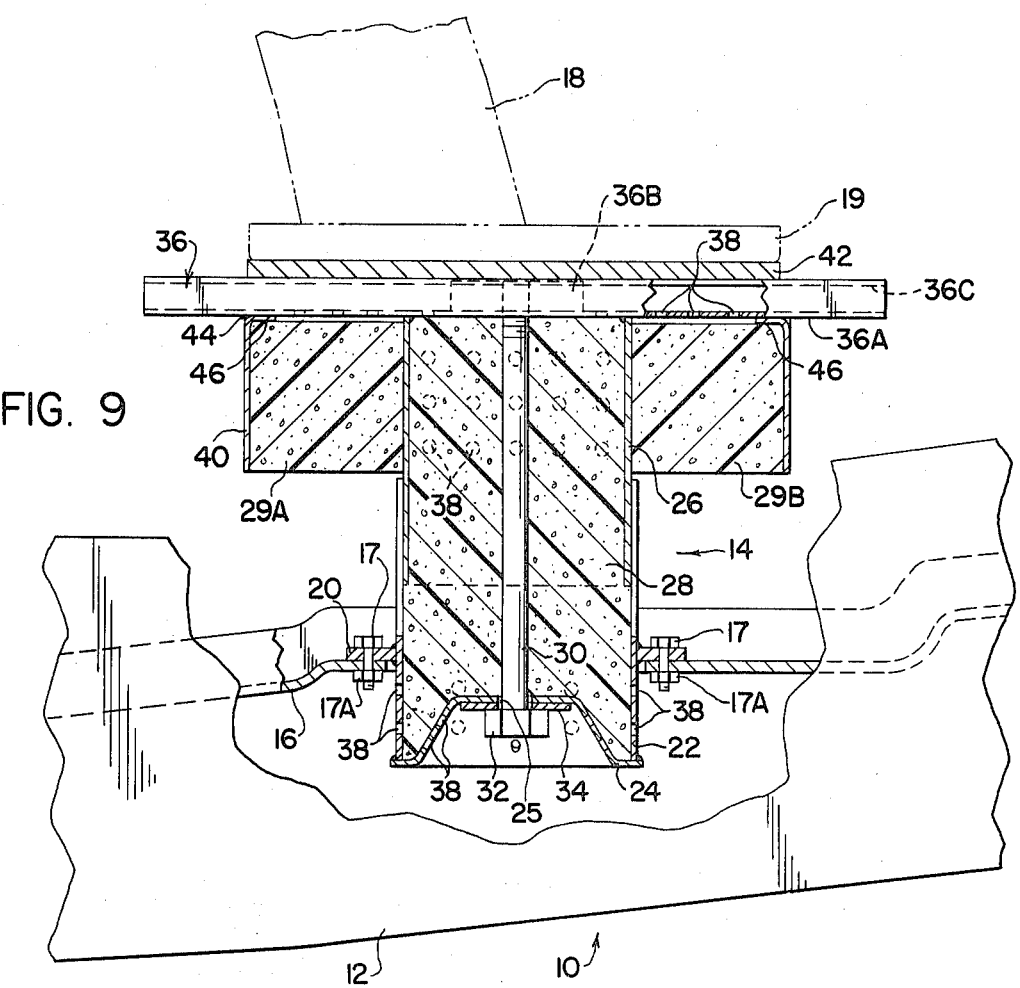
FIG. 9 is an enlarged partial section plan view of the structure shown in FIG. 7.

As best shown in FIGS. 7 and 9, bumper assembly 10 is completed by bolting reinforcing web 16 to flanges 20 by means of lock bolts 17 and nuts 17A.

The operation of the energy absorbing bumper of the invention is best illustrated with reference to FIGS. 4, 5, 6, 7 and 9. FIGS. 7 and 9 show (respectively, in sectional side elevation and plan views) energy absorber 14 in its normal or non-impact position. The position of inner chamber 26 relative to outer chamber 22, and of bumper face bar 12 relative to center bolt 30 should be particularly noted.

On sustaining a frontal impact, (FIG. 5) the force of which is shown by a vector arrow F, impact forces are transmitted from bumper face bar 12 to outer chamber 22 (via reinforcing web 16 and flange 20) and outer chamber 22 is driven towards the vehicle in a direction substantially parallel to the longitudinal axis of center bolt 30. Outer chamber 22, being rigidly affixed to reinforcing web 16 of bumper face bar 12, is driven backward and slides telescopically over inner chamber 26. Foam plastic material 28 is thereby compressed within chambers 22 and 26 between recessed end wall 24 and slide bar 36. The compression of the foam plastic material helps to absorb the energy of impact, by mechanical compression of the material, compression of the air (or gas) inside closed cells contained in the foam material, and by compression and escape of air (or gas) from the open cells through interstices of the foam plastic material, all as described above. Air expelled from open cells of plastic foam material 28 upon compression emerges through air escape ports 38 located in chambers 22 and 26, slide bar 36, and recessed end wall 24.

Upon release or expenditure of the impact force, the resiliency of plastic foam material 28 returns the components to their normal, non-impact position. Chambers 26 and 22 are maintained in alignment by center bolt 30. The travel of outer chamber 22 upon returning to its normal position is stopped by recessed end wall 24 being seated against washer 34 and nut 32. As plastic foam material 28 resumes its normal shape, air enters the evacuated open cells and full energy-absorption capability is restored.

Figure 4:
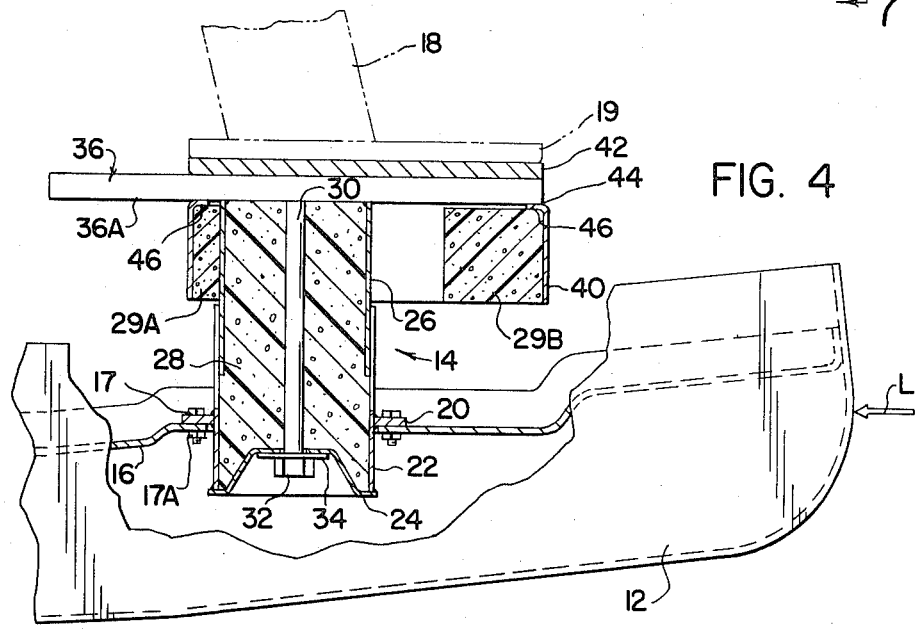
FIG. 4 is an enlarged plan view in partial section of a portion of the bumper of FIG. 1 shown in a lateral-impact compressed position.
Figure 5:
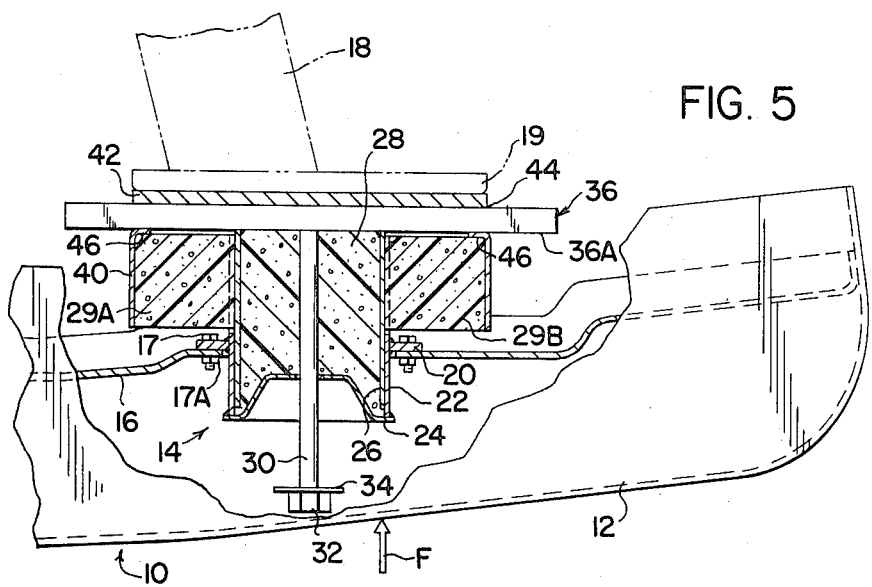
FIG. 5 is an enlarged plan view in partial section of a portion of the bumper of FIG. 2, shown in a frontal-impact compressed position.

Referring now to FIG. 4, lateral impact forces shown by vector arrow L, are transmitted through bumper face bar 12 and reinforcing web 16 to outer chamber 22 and consequently, through inner chamber 26 to slide bar 36. Slide bar 36 is thereby displaced laterally relative to fixed housing 40. Consequently, the telescopically engaged chambers move laterally towards a side of fixed housing 40, and foamed plastic material block 29A is compressed between inner chamber 26 and fixed housing 40. The compression of the foam plastic material helps to absorb the energy of impact as described above with respect to foam plastic material 28. Air escepting from the foam plastic material 29A under compression escapes through the open front portion of fixed housing 40, and through air escape ports 38. Slide bar 36 is seen to be long enough to remain in engagement with each of the two guide flanges 46 even at maximum side-wise displacement.

As stated above, the natural resiliency of the foam plastic material block 29A causes it to spring back to its original shape and to realign the components of the energy absorbing assembly after the impact forces are removed. Naturally, the same energy-absorbing action as described above is obtained by compression of foam plastic material blocks 29B by a lateral impact opposite in direction to that represented by vector arrow L.

Figure 6:
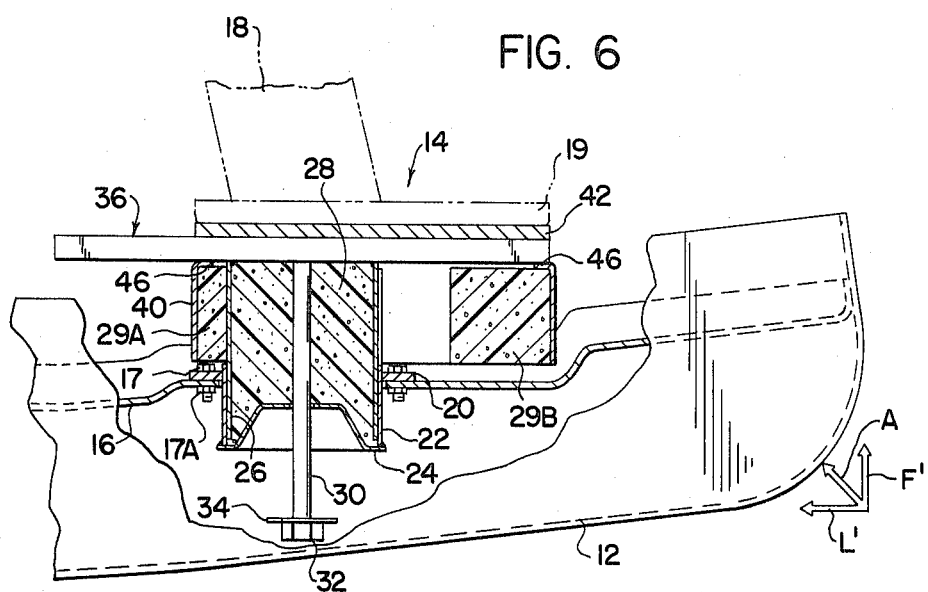
FIG. 6 is an enlarged plan view in partial section of a portion of the bumper of FIG. 1, shown in a 45°-impact compressed position.

The action of the energy absorbing assembly in the more usual circumstance of an impact force being imposed at an angle between that of a frontal impact and a lateral impact is shown in FIG. 6, wherein a 45° angle impact is shown with the impact forces being represented by a vector arrow A. (not to scale). The compression of foam plastic material 28 by the telescopic engagement of inner chamber 26 and outer chamber 22, and the compression of foam plastic material 29A (or, alternatively, 29B) between the chambers 22, 26 and fixed housing 40 occur simultaneously, so that energy absorption from both the frontal force vector F' and the lateral force vector L' occurs simultaneously.

It will be appreciated that regardless of the angle at which bumper face bar 12 is struck, and regardless of the point or points of impact along bumper face bar 12, lateral and frontal-impact forces will be simultaneously absorbed by the biaxial energy absorber assembly 14. It will further be appreciated that the two energy absorber assemblies 14 and 14' shown in FIG. 1 will cooperate, each to absorb a share of the total impact energy, and that more or fewer than two energy absorber assemblies may be employed in conjunction with any given bumper.

It will further be appreciated that many modifications may be made to the specific structure shown in the preferred embodiment described above, which nonetheless do not take the modified structure out of the scope of the invention. For example, a closed cell foam plastic material may be employed as the energy absorbing material, in which case there would be no need for air escape ports 38. Alternatively, an energy absorbing material other than a foam plastic material may be employed. Other resilient plastic materials, or natural or synthetic rubber, or other elastomers, alone or in combination, may be employed. Further, suitably arranged metal springs or other resilient members may be employed either to replace blocks of foam plastic or rubber material or the like, or such springs or other resilient members may be employed in conjunction with such foam plastic or other resilient material to supplement their energy-absorbing ability. However, particularly for use as an automobile bumper, the energy absorption capacity of tight, open cell plastic foam material is sufficient, and its use alone, without supplemental springs or the like, is preferred because of the resultant simplicity of construction.

Obviously, the configuration of the inner and outer chambers, slide bar, fixed housing, etc. may be varied considerably without departing from the scope of the invention. For example, the substantially rectangular cross-sectional configuration of inner and outer chambers 22 and 26 may be modified so that such chambers have cylindrical or any other desired shape in cross-section; and means other than a center bolt may be employed to maintain the telescopic chambers in alignment; the slide bar may be mounted to the backing plate by means of guides which are not integrally formed from the fixed housing, there may be more than two chambers arranged in telescopic engagement, etc.

In short, it is intended to include all such modifications and alterations of the foregoing described shock absorbing bumper, insofar as they fall within the scope of the appended claims.

What is claimed is:

1. A shock absorbing bumper comprising an impact-receiving face bar affixed to at least one shock absorbing device, each of which devices comprises two chambers mounted in telescopic engagement one with the other upon a slide bar, said impact receiving face bar being affixed to the outer of said two telescopic chambers, said chambers being at least partially encompassed by a fixed housing which is co-extensive with a segment at least of the longitudinal axis of said chambers, said slide bar being received in sliding engagement by slots provided in said fixed housing, so that said slide bar is movable in a plane transverse to the longitudinal axis of said chambers, shock absorbing material contained within said chambers whereby closing movement of said chambers compresses said shock absorbing material therebetween, and shock absorbing material contained between said chambers and said fixed housing whereby lateral movement of said chambers toward said fixed housing compresses a part at least of said shock absorbing material between said fixed housing and said chambers.

2. The device of claim 1 wherein first and second blocks of shock absorbing material are placed, respectively, adjacent to first and second portions of said fixed housing, between said housing and said chambers.

3. The bumper of claim 1 wherein said longitudinal support means comprises a bolt passing through said chambers substantially parallel to the longitudinal axis thereof,
the outer of said telescopically engaged chambers is closed by an end wall containing an aperture which aperture receives said bolt in sliding engagement therewith, and said bolt carries at its outer end a stop to limit the opening movement travel of said chambers.

4. The bumper of claim 3 wherein the outer of said telescopically engaged chambers is closed by an end wall containing an aperture which aperture receives said bolt in sliding engagement therewith, and said bolt carries at its outer end a stop to limit the opening movement travel of said chambers.

5. The bumper of claim 1 wherein surfaces of said shock absorbing device which are in direct contact with said shock absorbing material contain one or more air escape ports.

6. The bumper of claim 1 wherein said shock absorbing material comprises a resilient foam plastic material.

7. The bumper of claim 6 wherein said foam plastic material has a density between about 10 pounds per cubic foot and about 20 pounds per cubic foot.

8. The bumper of claim 6 wherein said foam plastic material is selected from the class consisting of ureaformaldehyde, polyurethane and epoxy plastic foam materials and combinations thereof.

9. A shock absorbing device comprising at least two chambers mounted in telescopic engagement with one another along a common longitudinal axis defined by longitudinal support means comprising a bolt passing through said chambers,
a fixed housing co-extensive with a portion at least of said longitudinal axis of said chambers,
a slide bar mounted in lateral sliding engagement relative to said fixed housing,
one of said chambers being fixed to said slide bar,
the outer end of said bolt having a stop to limit the opening movement travel of said chambers, and the inner end of said bolt being affixed to said slide bar,
shock absorbing material contained within said chambers and structurally associated therewith so that said shock absorbing material is compressed by closing movement of said chambers, and
shock abosrbing material disposed between said chambers and said fixed housing whereby lateral movement of said chambers compresses a part at least of said shock absorbing material between said fixed housing and said chambers.

10. The device of claim 9 wherein first and second blocks of shock absorbing material are placed, respectively adjacent to first and second portions of said fixed housing between said housing and said chambers.

11. The device of claim 9 wherein said device further includes an impact receiving face bar affixed to one of said chambers.

12. The device of claim 9 wherein said shock absorbing material comprises a foam plastic material.

13. The device of claim 12 wherein said foam plastic material is selected from the class consisting of ureaformaldehyde, polyurethane, and epoxy foam plastic materials, and combinations thereof.

14. The device of claim 13 wherein said foam plastic material has a density greater than about 7 pounds per cubic foot and contains open cells, the open cells comprising between about 90 to 99 percent of the total number of cells in said material.

* * * * *